United States Patent [19]

Brower

[11] 4,026,007
[45] May 31, 1977

[54] ROLL FINISHING PROCESS

[75] Inventor: Van Pelt Brower, Wilbraham, Mass.

[73] Assignee: Monsanto Company, St. Louis, Mo.

[22] Filed: May 19, 1975

[21] Appl. No.: 578,694

[52] U.S. Cl. .................... 29/527.4; 72/53; 29/121.8

[51] Int. Cl.$^2$ .................... B22D 11/126

[58] Field of Search ........ 29/148.4 D, 527.4, 121.8

[56] References Cited

UNITED STATES PATENTS

| | | | |
|---|---|---|---|
| 1,932,168 | 10/1933 | Adams ........................ | 29/148.4 D |
| 2,114,072 | 4/1938 | Cleveland .................... | 29/527.4 |
| 2,609,780 | 9/1952 | Whitbeck .................... | 29/527.4 X |
| 2,638,050 | 5/1953 | King .......................... | 29/148.4 D X |
| 2,765,682 | 10/1956 | Wiley ......................... | 76/107 |
| 3,171,528 | 3/1965 | Andersen ..................... | 65/114 X |
| 3,177,558 | 4/1965 | Gronholz et al. .............. | 29/121 |
| 3,245,897 | 4/1966 | Lane .......................... | 29/121 |
| 3,310,860 | 3/1967 | Gronholz et al. .............. | 29/148.4 D |
| 3,372,016 | 3/1965 | Rahrig et al. ................. | 65/114 |
| 3,613,319 | 10/1971 | Takimura et al. .............. | 29/148.4 D |
| 3,723,083 | 3/1973 | Ritter, Jr. et al. ............ | 29/121.8 |

Primary Examiner—Milton S. Mehr
Assistant Examiner—V. Rising
Attorney, Agent, or Firm—W. J. Farrington; J. C. Logomasini; S. M. Tarter

[57] ABSTRACT

Disclosed herein is an improved process for finishing a die roll which is used to prepare interlayers for laminated safety glass. The improvement comprises the blasting of the roll with glass beads after the conventional grit blasting steps and before chrome plating. Interlayers prepared using rolls made by this process are characterized by having surfaces which are more printable without sacrificing the surface roughness required to prevent blocking of the sheet and to facilitate de-airing of laminates prepared from the interlayer.

3 Claims, 2 Drawing Figures

ROLL FINISHING PROCESS

ROLL FINISHING PROCESS BACKGROUND OF THE INVENTION

1. Field of the Invention

The present invention relates to an improved process used in the finishing of die rolls used in the manufacture of interlayers for laminated safety glass. More particularly, the invention relates to a method for reducing the peaks in the surface of the roll without substantial reduction of the valleys.

2. Description of the Prior Art

Laminated safety glass is well known in the art for use as glazing units for vehicles, especially automobile windshields, and for architectural uses. Laminated safety glass comprises at least one sheet of glass laminated to at least one sheet of a synthetic resin material which is usually referred to as the interlayer. The laminate may be the sandwich type construction wherein the interlayer is interposed between two pieces of glass. Alternately, the laminate may comprise a single sheet of glass laminated to a synthetic resin sheet (also referred to as an interlayer for the purposes of the present invention). In the latter type of laminated safety glass the surface of the synthetic resin sheet, which is not laminated to the glass, may optionally be coated with or laminated to another synthetic polymeric material.

Interlayers are conventionally prepared with rough surfaces, which may be the same or different for both sides of the sheet.

In die roll extrusion methods for preparing interlayers, molten polymeric material is cast onto a die roll. The die roll surface is specially prepared in order to achieve a desired degree of roughness. Sheet cast onto this rough surface then acquires a rough surface from the imprint of the die roll. The peaks and valleys on the surface of the sheet correspond to the valleys and peaks, respectively, on the surface of the die roll. The rough surfaces of the die roll and the sheet are defined herein in terms of peaks and valleys occurring around a roughness means centerline (hereinafter defined). The rough surfaces on the sheet are required in order to prevent blocking, i.e., the tendency of the interlayer to stick to itself. Rough surfaces are also required to prevent premature adhesion of the interlayer to the other component of the laminate, usually glass, and to facilitate de-airing of the laminate assembly during the lamination procedure.

Although the surface roughness helps to prevent blocking and facilitates de-airing, it causes problems in the printing of the surface of the sheet. The rougher the sheet the harder it is to obtain an acceptable printed gradient on the sheet. The deeper valleys in the sheet are especially troublesome in that they give rise to significant printing defects. Consequently, seasoning of the sheet, i.e., heating of the sheet at elevated temperatures for prolonged periods of time is required in order to obtain a uniform gradient.

Interlayer materials cast onto the die rolls of the prior art exhibit adequate surface roughness in regard to the anti-blocking and de-airing characteristics of the sheet. However, these sheets have deep valleys which give rise to printing defects which require seasoning in order to reduce or eliminate the defects. The deep valleys in the sheet are caused by the high peaks on the surface of the die roll.

A need exists in the art for an improved method for preparing die rolls and for the die rolls made by this method in order to produce interlayer materials with fewer deep valleys.

SUMMARY OF THE PRESENT INVENTION

The present invention fulfills the above mentioned need in the art by providing an improved process for the finishing of die rolls which are prepared by:

A. selecting a metal roll which is free of pits, holes or scratches or other defects and which has a surface roughness of 32 RMS or smoother;

B. blasting the roll with abrasive grit to obtain a saturated surface on the roll;

C. chrome plating the roll;

the improvement which comprises blasting the roll with glass beads after the grit blasting step and before the chrome plating step wherein the glass beads have a particle size larger than the base diameters of the prominent peaks i.e., those which will cause valleys greater than 0.4 mils (10.2 microns) from the RMCL in sheet cast on the roll, whereby the size and number of peaks on the roll is reduced such that molten sheet cast on the roll will have a sheet surface which is characterized by having:

1. an arithmetic average roughness in the range of from 12 to 18 × $10^{-5}$ inches (3.1 to 4.6 microns) as calculated around a roughness mean centerline drawn through the peaks and valleys on the surface of the sheet; and
2. a roughness height in the range of from 48 × $10^{-5}$ to 72 × $10^{-5}$ inches (12.2 to 18.3 microns)

wherein at a distance of 0.4 mil (10.2 microns) or less from the means centerline going in the direction to the center of the sheet there are substantially no valleys on the surface of the sheet.

$$AA = \frac{H_1 + H_2 + H_3 - H_n}{n}$$

Line C-D represents the Roughness Height which is four times the Arithmetic Average which may be expressed by the following formula:

$$RH = 4\ AA \qquad \text{(Formula II)}$$

The lines E-F and E'F', which are equidistant above and below the RMCL, define a null band around the RMCL. In the interlayers prepared using the die rolls of the present invention, when the line E'-F' is placed 0.4 mil (10.2 microns) below the RMCL, i.e., going towards the center of the sheet, there will be substantially no valleys below the line E'–F'. Stated in another way, when the line E'–F' is 0.4 mil (10.2 microns) below the RMCL the area of the valleys below the line E'–F' is substantially zero. On the other hand, when the line E–F is 0.4 mil (10.2 microns) above the RMCL, there will still be a substantial number of peaks above it on the surface of the sheet. It should be noted here that these peaks are functional in that they provide the surface roughness which minimizes blocking and facilitates de-airing. On the other hand, the deep valleys are not functional and may give rise to printing defects.

Figure 1:
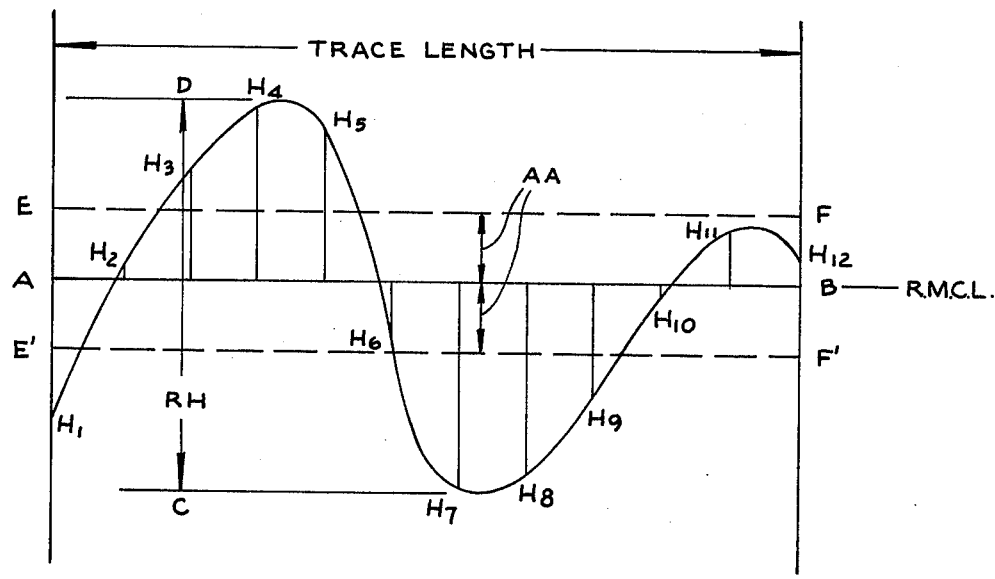
FIG. 1 illustrates a cross section (not to scale) showing the surface of an interlayer for laminated safety glass. The line A-B is the roughness means centerline (RMCL). The RMCL is drawn so that the area of the peaks above the line is equal to the area of the valleys below the line. The distance of equi-spaced points $H_1$ to $H_{12}$ on the surface from the RMCL are determined and these measurements are used to obtain the Arithmetic Average roughness (AA). The Arithmetic Average roughness is determined by adding the distances of each point from the mean centerline and then dividing the sum of these distances by the total number of points according to the following formula.
Figure 2:
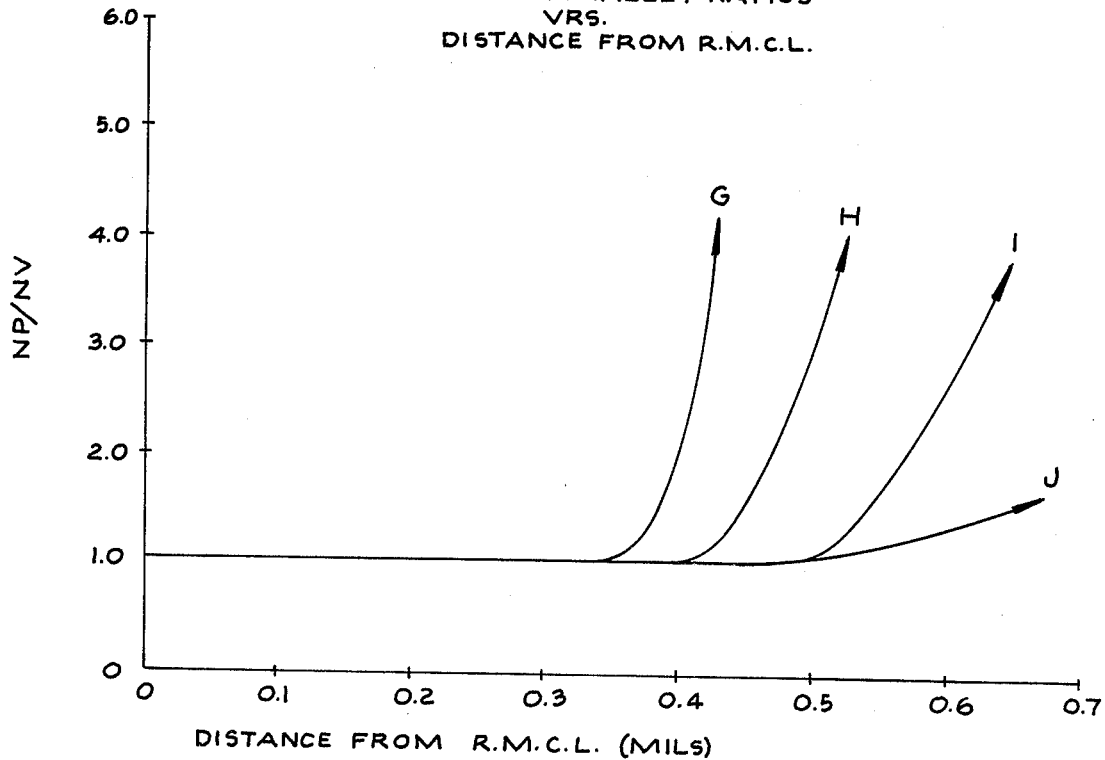

FIG. 2 is a plot of the ratio of the number of peaks (NP) to the number of valleys (NV) at various points equidistant above and below the roughness mean centerline (RMCL). The distances were taken along the lines E–F and E'–F' illustrated in FIG. 1 at points from 0.1 to 0.7 mil (2.5 to 18 microns) above and below the RMCL. Curve G was made on plasticized polyvinyl butyral interlayers using a die roll finished according to the method of the present invention. Curves H, I and J were made from conventional plasticized polyvinyl butyral interlayers using prior art sheet forming methods. Curves I and J represent sheet surfaces prepared using die rolls finished according to the method of the prior art which did not use glass beads in the finishing process.

A review of FIG. 2 indicates that with the interlayers of the present invention (see Curve G) the number of valleys approached zero at a distance of about 0.4 mil (10.2 microns) from the RMCL. When the valleys disappear the denominator NV becomes zero and the ratio goes to infinity.

The commercial interlayers represented by Curves H, I and J still have valleys remaining at distances greater than 0.4 mils (10.2 microns) beyond the roughness mean centerline. These deeper valleys are believed to give rise to printing defects when a gradient band is printed on the sheet as will be explained in greater detail below.

DESCRIPTION OF THE PREFERRED EMBODIMENTS

The die rolls of the present invention are prepared by taking a metal roll, preferably a chilled iron roll, which is free of pits, holes, scratches or other defects and which has a surface roughness of 32 RMS or smoother, preferably 16 RMS or smoother. The rolls are then tested in a conventional manner by blasting the roll, while it is rotating on its axis, with conventional blasting grit such as aluminum oxide, silicone oxide, etc. The size of the grit used is usually in the range of from 10 to 60 mesh, preferably 12 to 24 mesh, as determined by a U.S. standard sieve. The base roll is blasted using air pressure in the range of from 50 to 250 psi (3.5 to 17.6 kgs./sq.cm.). A number of passes are made over the roll with the blasting grit until the desired saturated surface roughness is obtained. With a 20 rpm roll speed, the blast nozzle traverse rate is preferably 2.0 inches/minute (5.1 cm/minute). Usually, the number of passes will be in the range of from 6 to 12. The feed rate for the blasting grit is in the rane of from 2 to 40 pounds (.91 to 18.1 kg.), preferably 8 to 12 pounds (3.6 to 5.5 kg) of grit per minute according to the improved process of the present invention.

The roll is then blasted with glass beads in order to reduce the size and amount of the prominent peaks on the surface of the roll. The glass beads used are the same size or slightly smaller than the abrasive grit used. Preferably, the glass beads are larger than the average base diameters of the prominent peaks to permit reducing prominent peaks without filling in the valleys in the roll. Most preferably, the size of the glass beads is in the order of from 4 to 8 times larger than the base diameters of the prominent peaks. The diameters of the bases of the peaks are determined using a Gould Surfanalyzer. Usually, one to two passes of glass beads are empolyed while rotating the roll as described above.

The roll is then plated with chrome, nickel or some other suitable metal and the metal plated surface is then overblasted with fine grit, usually finer (or smaller) than 60 mesh, preferably 100 to 140 mesh. The surface of the finished roll is characterized by having peaks and valleys around a roughness means centerline (RMCL) which corresponds generally to the valleys and peaks, respectively, found on sheets which are cast upon the roll. In this regard, it should be noted that about 70 to about 90% of the surface characteristics of the roll are transferred to the sheet material cast onto the roll when using conventional die rolls extrusion techniques. When viewed in this light, the roll surface can be considered as a negative of the surface of the sheet.

As stated above, only the peaks on the surface of the sheets are functional in that they prevent blocking, support the glass or plastic member of the laminates during the lamination procedure and provide the air passages which facilitate de-airing during the fabrication of the laminate. The deep valleys found in the sheet are not functional. In fact, they are undesirable in that they give rise to printing defects in the rotogravure printing of the sheet.

The present invention as directed to the discovery that die rolls, which are blasted with glass beads after the conventional abrasive grit blasting and before chrome plating, have improved surfaces. Molten thermoplastic sheet material cast onto these die roll surfaces have fewer deep valleys while maintaining the peaks thereby providing better sheet surfaces for printing while maintaining the antiblocking and de-airing properties found in the sheets of the prior art.

The plastic sheet material prepared using the die rolls of the present invention may be prepared from various thermoplastic synthetic polymers. Examples of such polymers include polyvinyl butyral, polyurethane, poly(ethylenevinyl acetate), poly(ethylene-vinyl acetate-vinyl alcohol), poly(ethylenemethyl methacrylate-acrylic acid), etc. The preferred materials are plasticized polyvinyl butyral and polyurethane with polyvinyl butyral being especially preferred. These materials are well known to those skilled in the art.

The preferred polyvinyl butyral materials have Staudinger molecular weights ranging from about 50,000 to 600,000 and preferably from 150,000 to 270,000 and may be considered to be made up on a weight basis, of from 5 to 25% hydroxyl groups, calculated as polyvinyl alcohol, 0 to 40% ester groups, calculated as polyvinyl ester, and the balance substantially butyral groups. The polyvinyl butyral resin will preferably contain, on a weight basis, from 9 to 30% hydroxyl groups, calculated as polyvinyl alcohol and from 0 to 3% acetate groups, calculated as polyvinyl acetate, the balance being substantially butyral groups.

The polyvinyl butyral resin used may be plasticized with from about 20 to 80 parts plasticizer per hundred parts of resin and more commonly between 25 and 45 parts for normal windshield use. This latter concentration is generally used with polyvinyl butyrals containing 17 to 25% vinyl alcohol by weight. In general, the plasticizers which are commonly empolyed are esters of a polybasic acid or a polyhydric alcohol. Particularly suitable plasticizers are triethylene glycol di-(2-ethyl butyrate), dihexyl adipate, dibutyl sebacete, and mixtures of phosphates and adipates such as are described in U.S. Pat. No. 3,841,890. The resulting plasticized resin mixture is then generally extruded in the form of sheets which are then printed as described below.

The preferred polyurethane materials are those described in U.S. Pat. Nos. 3,620,905, 3,823,060, and Belgium Patent 785,125, which are incorporated herein by reference.

In the following examples the base die roll used is a chilled iron roll which is free of pits, holes, scratches or other defects which has a surface roughness of 16 RMS or smoother. The base roll is then finished as described in the particular examples.

The resin used to prepare the sheets in the following examples is conventional polyvinyl butyral which is plasticized with about 44 parts, per hundred parts of resin, of triethylene glycol di-2-ethylhexyl butyrate. The butyral is further characterized as having less than 3% by weight of residual acetate groups and a hydroxyl content in the range of from 17 to 23% by weight.

The roughness of the roll surface and the sheet surface is determined using a Gould Surfanalyzer Model 150 and a Gould Surfanalyzer Recorder Model 280.

EXAMPLE I

PRIOR ART

This example is set forth to illustrate the practice of the prior art in preparing interlayers for laminated safety glass.

A conventional base die roll is surfaced by blasting it with No. 16 mesh aluminum oxide grit using an air pressure of about 100 psi gauge and a grit feed rate of about 10 lbs. (4.54 kg.) per minute in order to obtain a saturated surface on the roll. The aluminum oxide used is commercial grade No. 16 grit which contains a broad range of particle sizes. Eight (8) blasting passes are made over the roll with the aluminum oxide grit. The blasted roll is then plated with chomium to a thickness of about 0.002 inch (0.051 micron). The plated roll is then blasted with 120 mesh aluminum oxide grit in order to further minimize previously described blocking tendencies of the interlayer. A tracing of the plated roll is made using a Gould Suranalyzer and the roll is found to have a surface Roughness Height of $120 \times 10^{-5}$ inches 830.5 microns) as opposed to a surface Roughness Height of $128 \times 10^{-5}$ inches (32.5 microns) for the roll prior to chrome plating.

Molten plasticized polyvinyl butyral is extruded onto this die roll using a stock temperature of 385°–390° F. (196°–199° C.) and an extruded head pressure of 3500–4500 psi (246 to 316 kgs./sq.cm.) and formed into a conventional interlayer sheet material. The sheet is found to have a surface roughness characterized by an Arithmetic Average in the range of from $16.5 \times 10^{-5}$ to $21 \times 10^{-5}$ inches (4.2 to 5.3 microns) and a Roughness Height of from $66 \times 10^{-5}$ to $84 \times 10^{-5}$ inches (16.8 to 21.3 microns). The ratio of the number of peaks (NP) to the number of valleys (NV) is plotted at various distances from the roughness means centerline (RMCL). The result of this plot is represented by Curve J in FIG. 2.

EXAMPLE 2

PRIOR ART

The die roll preparation method of Example 1 is repeated here except that the chilled iron roll is blasted with 14 mesh silicon carbide. The chrome plated roll has a Roughness Height of $127 \times 10^{-5}$ inches (31.6 microns) as determined by the Gould Surfanalyzer. The sheet formed on this roll, using an extruder stock temperature in the range of 400° to 420° F. (204° to 216° C.), is characterized as having an Arithmetic Average surface roughness in the range of from 18.5 to $10^{-5}$ to 24.3 to $10^{-5}$ inches (4.7 to 6.2 microns) and a Roughness Height of from $74 \times 10^{-5}$ to $97 \times 10^{-5}$ inches (18.8 to 24.6 microns). The plot of the ratio of the number of peaks (NP) to the number of valleys (NV) at various distances from the roughness mean centerline (RMCL) is represented by Curve I in FIG. 2.

A comparison of Curve J in FIG. 2 shows that the sheet prepared in Example 2 above (Curve I) has fewer deep valleys than the sheet prepared in Example 1 (Curve J). However, both sheets, which are prepared according to the methods of the prior art, have a substantial number of valleys which extend more than 0.4 mil (10.2 microns) below the roughness mean centerline.

EXAMPLE 3

This example illustrates the sheet surface of a commercially available plastcized polyvinyl butryal interlayer (Butacite 106 from duPont) which is prepared by an extrusion method which does not involve the use of a die roll. The surface of the sheet was analyzed using a Gould Surfanalyzer and the procedure set forth above. The sheet is found to have an Arithmetic Average roughness of $16.3 \times 10^{-5}$ to 18 to $10^{-5}$ inches (4.1 to 4.6 microns) and a Roughness Height of $65 \times 10^{-5}$ to $72 \times 10^{-5}$ inches (16.5 to 18.3 microns). The ratio of the number of peaks (NP) to the number of valleys (NV) was plotted at various distances from the roughness mean centerline (RMCL). The result of this plot is represented by Curve H in FIG. 2.

EXAMPLE 4

This example illustrates the improved process of the present invention for preparing die roll surfaces. Example 1 is repeated here except that 20 mesh aluminum oxide grit is used to blast the base die roll. Ten (10) passes of blasting grit are made over the roll using an air pressure of 77 psi (5.4 kg/sq.cm). The surface Roughness Height of the roll before chrome plating is measured and found to be $80 \times 10^{-5}$ inches (20.3 microns). The prominent peaks on the roll have an average base diameter of about 6 mils (0.52 micron). The roll is then blasted with two glass beads having a mesh size in the range of from 20 to 30 (36 mil or 929 microns in diameter) using an air pressure of 110 psi (7.7 kg./sq.cm.). The surface Roughness Height of the roll before chrome plating is found to be $58.1 \times 10^{-5}$ inches (14.8 microns). The plasticized polyvinyl butyral sheet material made using this roll is found to have an Arithmetic Average surface roughness in the range of from $13 \times 10^{-5}$ to $16 \times 10^{-5}$ inches (3.3 to 4.1 microns) and a Roughness Height of from $52 \times 10^{-5}$ to $64 \times 10^{-5}$ inches (13.2 to 16.3 microns). The plot of the ratio of the number of valleys (NV) at various distances from the roughness mean centerline is represented by Curve G in FIG. 2.

A review of Curves G, H, I and J in FIG. 2 readily illustrate that the sheet on the die roll of the present invention (Curve G) has fewer deep valleys at a distance of 0.4 mil (10.2 microns) or less from the centerline than do those sheets from the prior art. The glass bead blasting used on the die roll used to prepare the sheet represented by Curve G is believed to remove the peaks on the roll which form the valleys in sheet material cast onto the roll.

As stated above, rough sheet surfaces give rise to printing defects on freshly printed sheet. One of the defects found in the gradient bands of freshly printed sheets is that which is referred to as mottle, which is defined as a random non-uniformity in color density. The degree of mottle is determined by laminating a freshly printed sheet between two pieces of glass and then examining the gradient band of the laminate using a uniform light source as a background for the laminate. A trained observer then assigns a mottle rating of from 0 to 10 to the gradient band, with the lower mottle ratings indicating fewer printing defects. Higher mottle ratings indicate that some amount of seasoning may be required in order to obtain the desired degree of uniformity in the gradient band.

In the preferred printing method, the ink is printed onto the interlayer using rotogravure type printing methods wherein a printing cylinder is engraved so as to form a cell pattern on the surface of the roll. The ink is picked up in the cells and then printed onto the sheet in the form of dots. The printing cylinders for automobile windshield sheet material are usually designed to give a color gradient. In the gradient printing process the ink is printed in a pattern such that there is a dark section at the top of the sheet which gradually and uniformily fades off into the clear section in the resulting laminated windshield. In this situation the darkest portion of the color gradient has an optical density in the range of from 1.70 to 0.70 which corresponds to a percent light transmission of from 2 to 20%, respectively.

EXAMPLES 5 to 8

The following Examples 5 to 8 illustrate the improved printing results that are obtained when printing on the surfaces prepared by extruding molten polymer onto a die roll prepared according to the present invention.

| INK COMPOSITION | | |
| --- | --- | --- |
|  | Parts by Weight | Percent |
| N-methyl pyrrolidone | 461.32 | 75.8 |
| polyvinyl butyral | 19.48 | 3.2 |
| antioxidant | 25.56 | 4.2 |
| Amaplast Yellow CHS | 26.47 | 4.35 |
| Plasto Yellow MGS | 23.74 | 3.9 |
| Amaplast Blue OAP | 25.56 | 4.2 |
| Plasto Violet MR | 26.47 | 4.35 |
| Total | 608.60 | 100.00 |

The ink, which has a dye concentration of 16.8% by weight and a Brookfield viscosity of 140 centipoises at 27° C., is printed onto the sheets of Examples 1 to 4 above, using a rotogravure cylinder having 127 micron (5 mil) cell spacings. A conventional gradient band printing process is used employing a wide variety of operating conditions such as line speed, temperature, pressures, etc. The printed gradients are then examined for mottle and the results are tabulated in Table I below.

TABLE I

| RATINGS OF LAMINATED FRESHLY PRINTED SHEET | | | |
| --- | --- | --- | --- |
|  | Sheet Surface | | |
| Example | Example | Figure 2 | Mottle Rating |
| 5 | 1 | J | 3− |
| 6 | 2 | I | 3+ |
| 7 | 3 | H | 2 |
| 8 | 4 | G | 1 |

The data in Table I above illustrate that the interlayers prepared on the die rolls of the present invention are more printable and have fewer printing defects than the interlayers prepared according to the prior art.

In other tests interlayers prepared using the die rolls of the present invention are laminated between two sheets of glass to form conventional laminates of the type used as windshields in automobiles. These interlayers (see Curve G in FIG. 2) are comparable to those interlayers of the prior art (see Curve I and J in FIG. 2) in regard to the general handling and performance characteristics involved in shaping, laying up and making the laminate. Little or no difference could be detected between these interlayers and those of the prior art in regard to the blocking or de-airing properties of the interlayer.

It will be apparent from reading the above specification that many changes and deviations can be made without departing from the spirit and scope of the present invention.

I claim:
1. In the process for the preparation of die rolls used in the manufacture of plastic sheet for laminated safety glass which process comprises:
   A. selecting a metal roll which is free of pits, holes or scratches or other defects and which has a surface roughness of 32 RMS or smoother;
   B. blasting the roll with abrasive grit to obtain a saturated surface on the roll;
   C. plating the roll with a suitable metal; and then
   D. roughening the plated surface by blasting with fine grit; the improvement which comprises blasting the roll with glass beads after the grit blasting step and before the chrome plating step wherein the glass beads have a particle size larger than the base diameters of the prominent peaks on the surface of the roll whereby the size and number of peaks on the roll is reduced such that the sheet material cast on the roll has a sheet surface which is characterized by having:
      1. an arithmetic average roughness in the range of from 12 to $18 \times 10^{-5}$ inches (3.1 to 4.6 microns) as calculated around a roughness mean centerline drawn through the peaks and valleys on the surface of the sheet; and
      2. a roughness height in the range of from 48 to $10^{-5}$ to $72 \times 10^{-5}$ inches (12.2 to 18.3 microns) wherein at a distance of 0.4 mil (10.2 microns) or less than the mean centerline going in the direction of the center of the sheet there are substantially no valleys on the surface of the sheet.
2. An improved process as in claim 1 wherein the glass beads have an average particle size 4 to 8 times larger than the average base diameter of the prominent peaks on the surface of the die roll.
3. An improved process as in claim 1 wherein the roll is plated with chrome.

* * * * *